(12) United States Patent
Langridge et al.

(10) Patent No.: US 8,657,683 B2
(45) Date of Patent: *Feb. 25, 2014

(54) ACTION SELECTION GESTURING

(75) Inventors: Adam Jethro Langridge, Guildford (GB); Christopher Matthews, Guildford (GB); Guy Simmons, Hampshire (GB); Peter Douglas Molyneux, Surrey (GB)

(73) Assignee: Microsoft Corporation, Redmond, WA (US)

(*) Notice: Subject to any disclaimer, the term of this patent is extended or adjusted under 35 U.S.C. 154(b) by 8 days.

This patent is subject to a terminal disclaimer.

(21) Appl. No.: 13/149,749

(22) Filed: May 31, 2011

(65) Prior Publication Data

US 2012/0309535 A1 Dec. 6, 2012

(51) Int. Cl.
A63F 9/24 (2006.01)
(52) U.S. Cl.
USPC .............. 463/36; 463/30; 463/31; 463/32; 463/37; 463/38; 463/39
(58) Field of Classification Search
USPC ..................................... 463/30–32, 36–39
See application file for complete search history.

(56) References Cited

U.S. PATENT DOCUMENTS

| | | | |
|---|---|---|---|
| 6,128,003 A | 10/2000 | Smith et al. | |
| 6,181,343 B1 | 1/2001 | Lyons | |
| 6,249,606 B1 | 6/2001 | Kiraly et al. | |
| 6,256,033 B1 | 7/2001 | Nguyen | |
| 6,795,068 B1 | 9/2004 | Marks | |
| 7,665,041 B2 | 2/2010 | Wilson et al. | |
| 7,701,439 B2 | 4/2010 | Hillis et al. | |
| 7,704,135 B2 * | 4/2010 | Harrison, Jr. | 463/7 |
| 7,770,136 B2 | 8/2010 | Beeck et al. | |
| 8,072,470 B2 * | 12/2011 | Marks | 345/632 |
| 2001/0024512 A1 | 9/2001 | Yoronka et al. | |
| 2003/0227453 A1 * | 12/2003 | Beier et al. | 345/419 |
| 2004/0166937 A1 * | 8/2004 | Rothschild et al. | 463/36 |
| 2004/0189720 A1 | 9/2004 | Wilson et al. | |
| 2006/0040720 A1 * | 2/2006 | Harrison, Jr. | 463/9 |
| 2009/0085864 A1 | 4/2009 | Kutliroff et al. | |
| 2009/0191968 A1 | 7/2009 | Johnson et al. | |
| 2010/0103106 A1 | 4/2010 | Chui | |
| 2010/0153996 A1 | 6/2010 | Migos et al. | |
| 2010/0194762 A1 | 8/2010 | Latta et al. | |
| 2010/0197391 A1 | 8/2010 | Geiss | |
| 2010/0199228 A1 | 8/2010 | Latta et al. | |

(Continued)

OTHER PUBLICATIONS

Harry Potter and the Deathly Hallows—Part 1 Videogame Available Worldwide from Nov. 16 [online], Nov. 16, 2010 [retrieved on Jul. 30, 2012]. Retrieved from the Internet: <URL: http://investor.ea.com/releasedetail.cfm?ReleaseID=530689>.*

(Continued)

*Primary Examiner* — Dmitry Suhol
*Assistant Examiner* — David Duffy
(74) *Attorney, Agent, or Firm* — Micha Goldsmith; Glen Johnson; Micky Minhas

(57) ABSTRACT

Gestures of a computer user are observed with a depth camera. A first gesture of the computer user is identified as one of a plurality of different action selection gestures, each action selection gesture associated with a different action performable within an interactive interface controlled by gestures of the computer user. A second gesture is identified as a triggering gesture that causes performance of the action associated with the action selection gesture.

14 Claims, 15 Drawing Sheets

(56) References Cited

U.S. PATENT DOCUMENTS

| | | |
|---|---|---|
| 2010/0266210 A1 | 10/2010 | Markovic et al. |
| 2010/0302138 A1 | 12/2010 | Poot et al. |
| 2010/0302145 A1 | 12/2010 | Langridge et al. |
| 2010/0306710 A1 | 12/2010 | Poot |
| 2010/0306712 A1 | 12/2010 | Snook et al. |
| 2010/0306714 A1 | 12/2010 | Latta et al. |
| 2010/0306716 A1 | 12/2010 | Perez |
| 2011/0085705 A1 | 4/2011 | Izadi et al. |

OTHER PUBLICATIONS

IGN. Sorcery PlayStation Move Demo—E3 2010 [online], Jun. 16, 2010 [retrieved on Jul. 27, 2021]. Retrieved from the Internet: <URL: http://www.dailymotion.com/video/xdpbx0_sorcery-playstation-move-demo-e3-20_videogames>.* gszfrk. Reviewables Ep. 3—Harry Potter Deathly Hallows Pt 1—The Kinect Bonus Levels [online], Novemeber 22, 2010 [retrieved Jul. 27, 2012]. Retrieved from the Internet <URL: http://www.youtube.com/watch?v=OWA4NPwmbMs>.*

Techpedition. Harry Potter and the Deathly Hallows Part 1 Kinect Homeplay [online]. Dec. 2, 2010 [retrieved 2012-003]. Retrieved from the Internet: <URL: http://www.youtube.com/watch?v=ZWPedbr6_1E>.*

Dudley, Brier. E3: New info on Microsoft's Natal—how it works, multiplayer and PC versions [online], Jun. 3, 2009 [retrieved on Nov. 8, 2012]. Retrieved from the Internet <URL: http://seattletimes.com/html/technologybrierdudleysblog/2009296568_e3_new_info_on_microsofts_nata.html>.*

Black & White [online]. 2001 [retrieved on Aug. 10, 2012]. Retrieved from the Internet:<URL: http://replacementdocs.com/request.php?341>.*

Schlattmann, et al., "Real-Time Bare-Hands-Tracking for 3d Games", Retrieved at <<http://cg.cs.uni-bonn.de/aigaion2root/attachments schlattmann-2009-games.pdf>>, In proceedings of IADIS International Conference Game and Entertainment Technologies, Jun. 17-23, 2009, pp. 9.

Hwang, et al., "Camera based Relative Motion Tracking for Hand-held Virtual Reality", Retrieved at <<http://hvr.postech.ac.kr/wiki/wiki.php/?action=download&value=%2FHwang_ICAT_2006.pdf>>, Jun. 2-3, 2006, pp. 6.

Cutler, et al., "View-based Interpretation of Real-time Optical Flow for Gesture Recognition", Retrieved at <<http://ieeexplore.ieee.org/stamp/stamp.jsp?tp=&arnumber=670984>>, Proceedings of the 3rd. International Conference on Face & Gesture Recognition, Apr. 14-16, 1998, pp. 6.

Liu, et al., "A survey of Speech-hand gesture Recognition for the development of Multimodal interfaces in Computer Games", Retrieved at <<http://ieeexplore.ieee.org/stamp/stamp.jsp?arnumber=05583252>>, Proceedings of IEEE International Conference on Multimedia and Expo, Jul. 19-23, 2010, pp. 1564-1569.

"Controlling Electronic Devices in a Multimedia System Through a Natural User Interface", U.S. Appl. No. 13/039,024, filed Mar. 2, 2011, pp. 1-46.

Santos, et al., "An integrated Approach to Virtual Tape Drawing for Automotive Design", <<Retrieved at http://vimmi.inesc-id.pt/publication.php?publication_id=110>>, Jul. 27, 2005, pp. 10.

Sepehri, et al., "Parametric Hand Tracking for Recognition of Virtual Drawings", Retrieved at <<http://afshin.sepehri.info/research/publications/icvs2006.pdf>>, Proceedings of the Fourth IEEE International Conference on Computer Vision Systems, Jan. 2006, pp. 10.

Moustakas, et al., "Master-Piece: A Multimodal (Gesture+Speech)", Retrieved at <<http://www.enterface.net/enterface05/docs/results/reports/project7.pdf>>, Enterface, Jul. 18-Aug. 12, 2005, pp. 1-14.

Celentano, et al., "Gestures, Shapes and Multitouch Interaction—Published Date: 2008", Retrieved at <<http://www.dsi.unive.it/~auce/docs/celentano_mimic08.pdf>>, Proceedings of the19th International Conference on Database and Expert Systems Application, Sep. 2008, pp. 5.

Zabulis, et al., "Vision-based Hand Gesture Recognition for Human-Computer Interaction", Retrieved at <<http://citeseerx.ist.psu.edu/viewdoc/download?doi=10.1.1.159.2565&rep=rep1&type=pdf>>, Jun. 2008, pp. 1-56.

Xu, et al., "Hand Gesture Recognition and Virtual Game Control Based on 3D Accelerometer and EMG Sensors", Retrieved at <<http://sclab.yonsei.ac.kr/courses/10TPR/10TPR.files/Hand%20Gesture%20Recognition%20and%20Virtual%20Game%20Control%20based%20on%203d%20accelerometer%20and%20EMG%20sensors.pdf>>, Proceedings of the 14th international conference on Intelligent user interfaces, Feb. 8-11, 2009, pp. 401-405.

Park, et al., "U-TOPIA: Campus-wide Advanced Ubiquitous Computing Environment", Retrieved at <<http://core.kaist.ac.kr/~woongbak/publications/paper_10.pdf, ICWN, 2007, pp. 8.

Langridge, Adam Jethro et al., "Action Trigger Gesturing," U.S. Appl. No. 13/149,737, filed May 31, 2011, 57 pages.

Langridge, Adam Jetro et al., "Shape Trace Gesturing," U.S. Appl. No. 13/149,752, filed May 31, 2011, 57 pages.

Lansdale, Tom et al., "Rein-Controlling Gestures," U.S. Appl. No. 13/149,730, filed May 31, 2011, 57 pages.

"International Search Report", Mailed Date: Jan. 31, 2013, Application No. PCT/US2012/039949, Filed Date: May 30, 2012, pp. 9.

Williams, Matt., "Reviewables Ep. 3—Hany Potter Deathly Hallows Pt I—The Kinect Bonus Levels", Retrieved at <<http://www.youtube.com/watch?v~OAW4NPwmbMs>>, Nov. 22, 2010, p. 1.

* cited by examiner

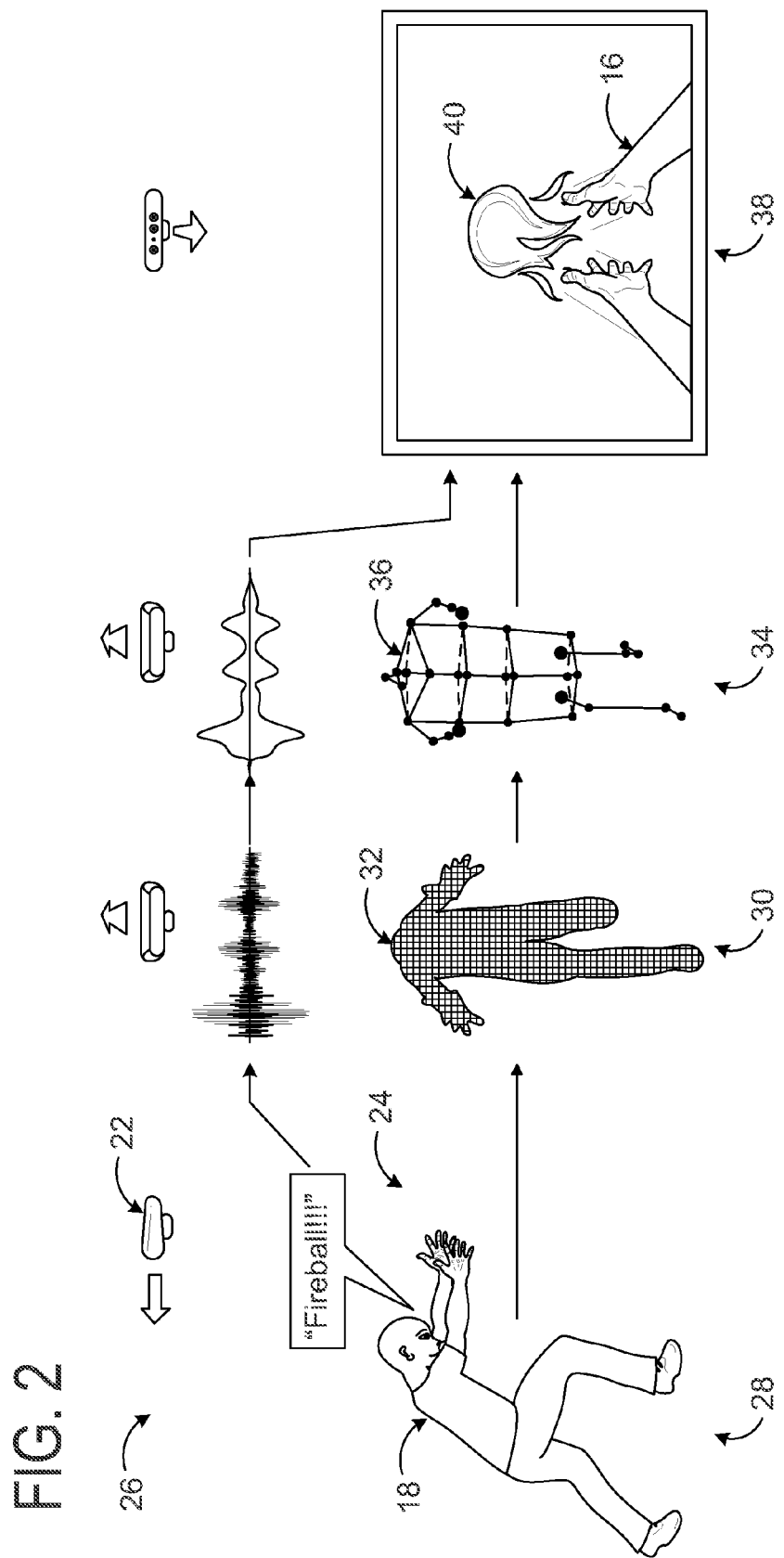

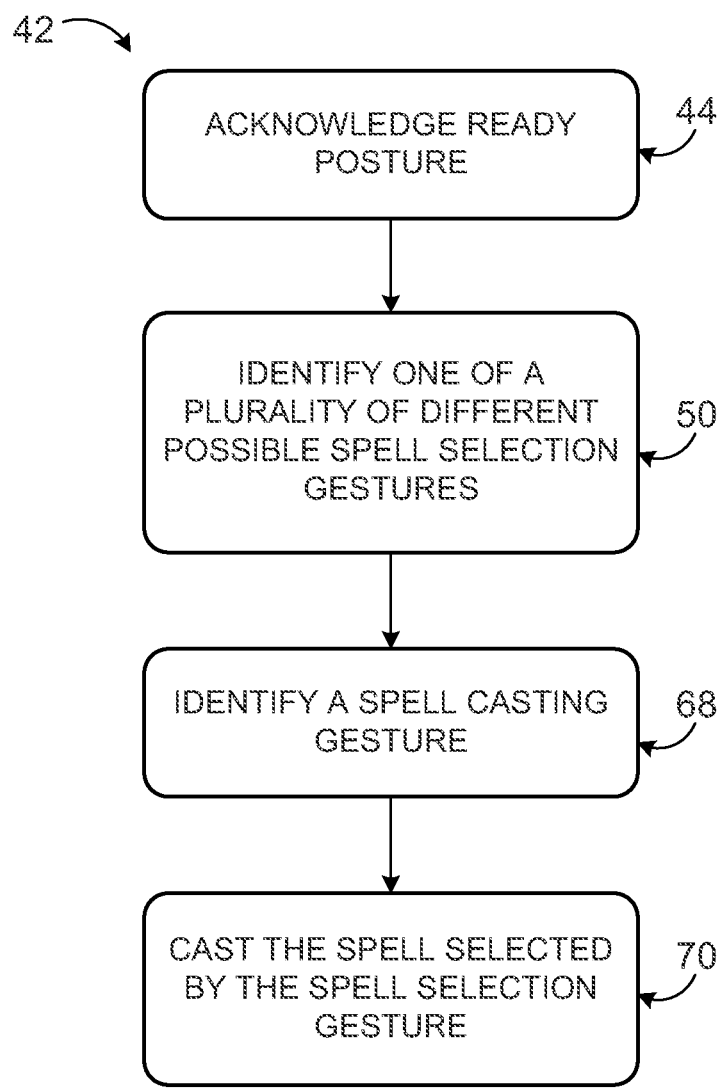

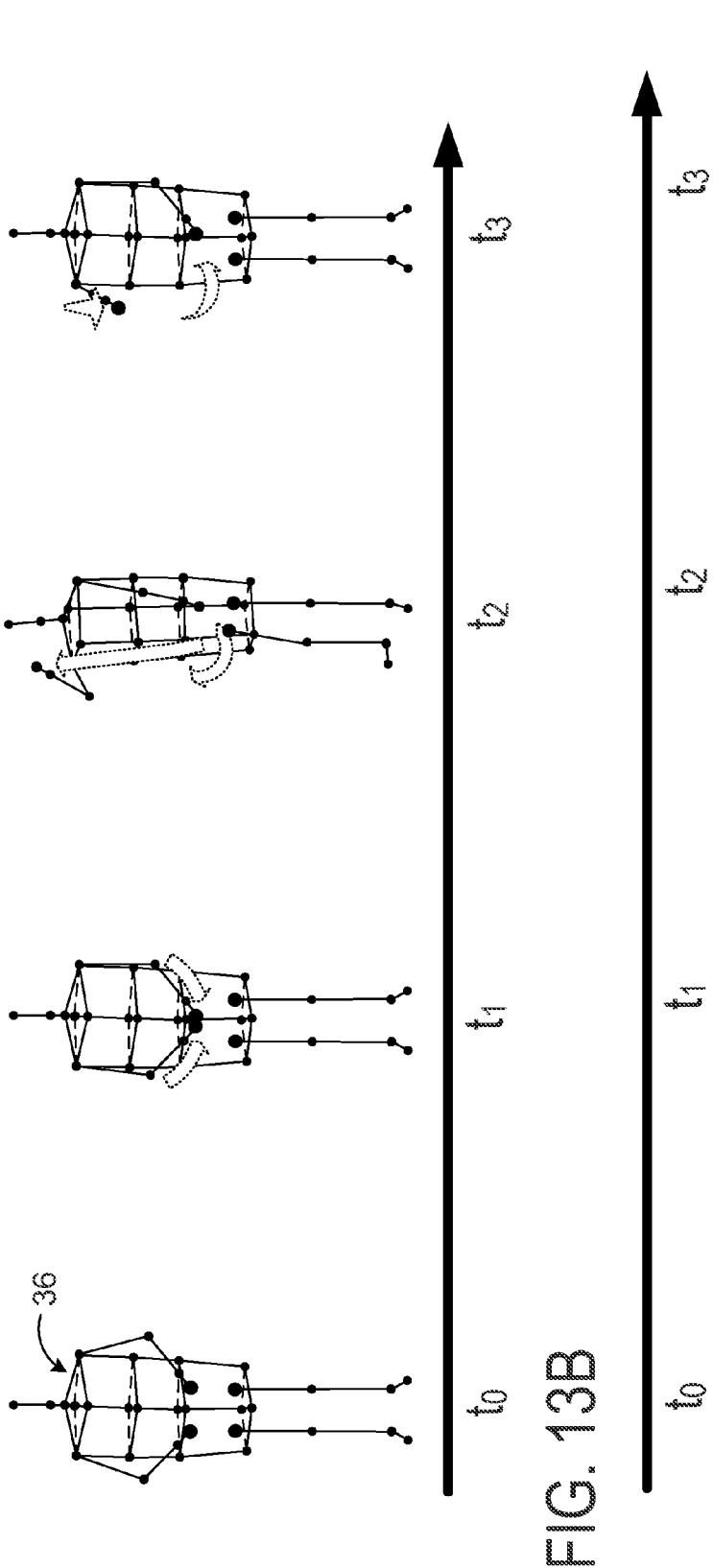
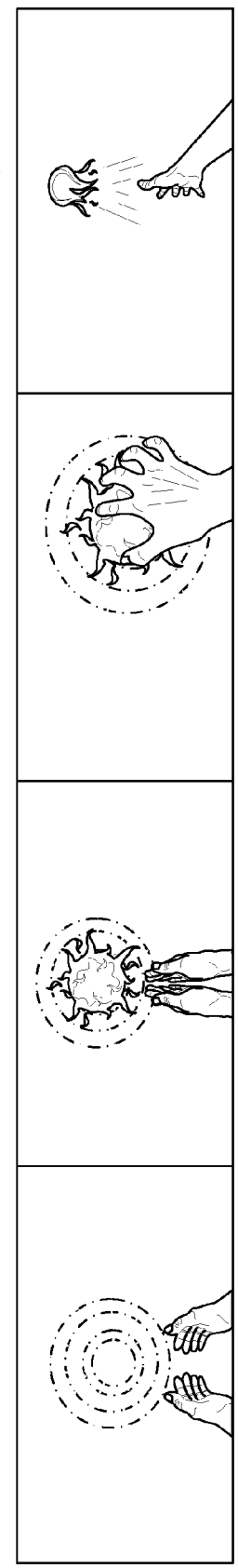
FIG. 13A
FIG. 13B

ACTION SELECTION GESTURING

BACKGROUND

While camera technology allows images of humans to be recorded, computers have traditionally not been able to use such images to accurately assess how a human is moving within the images. Recently, technology has advanced such that some aspects of a human's movements may be interpreted with the assistance of a plurality of special cameras and one or more tracking tags. For example, an actor may be carefully adorned with several tracking tags (e.g., retro-reflectors) that can be tracked with several cameras from several different positions. Triangulation can then be used to calculate the three-dimensional position of each reflector. Because the tags are carefully positioned on the actor, and the relative position of each tag to a corresponding part of the actor's body is known, the triangulation of the tag position can be used to infer the position of the actor's body. However, this technique requires special reflective tags, or other markers, to be used.

In science fiction movies, computers have been portrayed as intelligent enough to actually view human beings and interpret the motions and gestures of the human beings without the assistance of reflective tags or other markers. However, such scenes are created using special effects in which an actor carefully plays along with a predetermined movement script that makes it seem as if the actor is controlling the computer's scripted actions. The actor is not actually controlling the computer, but rather attempting to create the illusion of control.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Gestures of a computer user are observed with a depth camera. A first gesture of the computer user is identified as one of a plurality of different action selection gestures, each action selection gesture associated with a different action performable within an interactive interface controlled by gestures of the computer user. A second gesture is identified as a triggering gesture that causes performance of the action associated with the action selection gesture. According to one aspect of the disclosure, this type of action selection gesturing is used for selecting among several different spells that may be cast within a spell-casting game interface.

BRIEF DESCRIPTION OF THE DRAWINGS

FIG. 2 shows an example skeletal modeling pipeline in accordance with an embodiment of the present disclosure.

FIG. 3 shows an example two-stage spell casting method in accordance with an embodiment of the present disclosure.

FIG. 13A shows a skeleton performing an example one-handed spell throwing gesture in accordance with an embodiment of the present disclosure.

FIG. 13B shows an example interactive interface as a one-handed spell throwing gesture is performed.

DETAILED DESCRIPTION

A depth-image analysis system, such as a 3D-vision computing system, may include a depth camera capable of observing one or more game players or other computer users. As the depth camera captures images of a game player or other computer user within an observed scene, those images may be interpreted and modeled with one or more virtual skeletons. Various aspects of the modeled skeletons may serve as input commands to an interactive user interface. For example, a fantasy-themed, spell-casting game may interpret the physical movements of the game player as commands to select, aim, and cast specific spells in the game.

Figure 1:
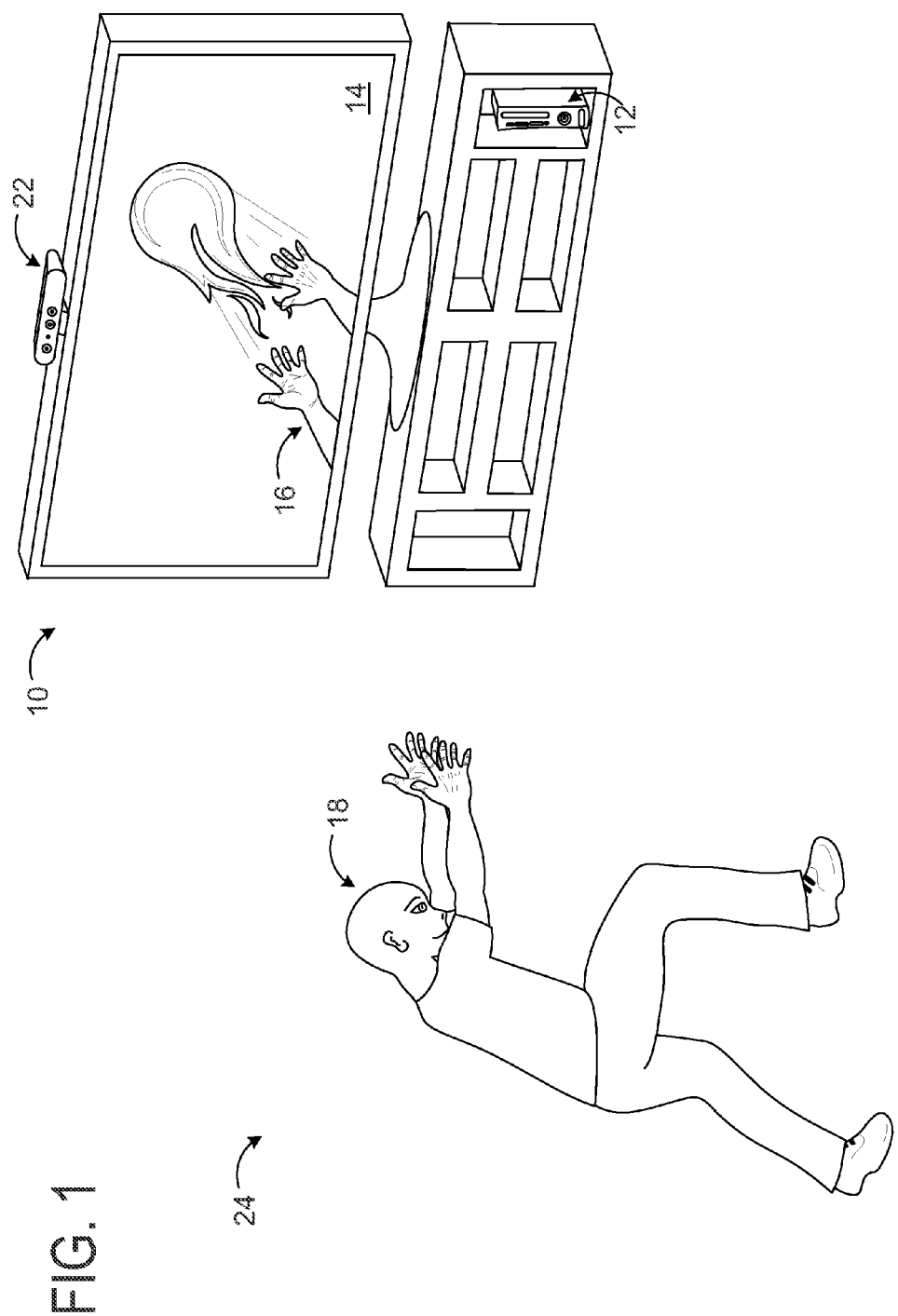
FIG. 1 shows a game player playing a spell-casting game in accordance with an embodiment of the present disclosure.

FIG. 1 shows a non-limiting example of an entertainment system 10. In particular, FIG. 1 shows a gaming system 12 that may be used to play a variety of different games, play one or more different media types, and/or control or manipulate non-game applications and/or operating systems. FIG. 1 also shows a display device 14 such as a television or a computer monitor, which may be used to present game visuals to game players. As one example, display device 14 may be used to visually present hands of an in-game player character 16 that game player 18 controls with his movements. The entertainment system 10 may include a capture device, such as a depth camera 22 that visually monitors or tracks game player 18 within an observed scene 24. Depth camera 22 is discussed in greater detail with respect to FIG. 18.

Game player 18 is tracked by depth camera 22 so that the movements of game player 18 may be interpreted by gaming system 12 as controls that can be used to affect the game being executed by gaming system 12. In other words, game player 18 may use his or her physical movements to control the game without a conventional hand-held game controller or other hand-held position trackers. For example, in FIG. 1 game player 18 is performing a spell throwing gesture to cast a fireball spell at game enemies. The movements of game player 18 may be interpreted as virtually any type of game control. Some movements of game player 18 may be interpreted as player character controls to control the actions of the game player's in-game player character. Some movements of game player 18 may be interpreted as controls that serve purposes other than controlling an in-game player character. As a nonlimiting example, movements of game player 18 may be interpreted as game management controls, such as controls for selecting a character, pausing the game, or saving game progress.

Depth camera 22 may also be used to interpret target movements as operating system and/or application controls that are outside the realm of gaming. Virtually any controllable aspect of an operating system and/or application may be controlled by movements of game player 18. The illustrated scenario in FIG. 1 is provided as an example, but is not meant to be limiting in any way. To the contrary, the illustrated scenario is intended to demonstrate a general concept, which may be applied to a variety of different applications without departing from the scope of this disclosure. As such, it should be understood that while the human controlling the computer is referred to as a game player, the present disclosure applies to non-game applications, and while the system is referred to as an entertainment system, the system may be used for non-entertainment purposes.

FIG. 2 shows a simplified processing pipeline 26 in which game player 18 in an observed scene 24 is modeled as a virtual skeleton 36 that can serve as a control input for controlling various aspects of a game, application, and/or operating system. FIG. 2 shows four stages of the processing pipeline 26: image collection 28, depth mapping 30, skeletal modeling 34, and game output 38. For simplicity of understanding, each stage of the processing pipeline shows the orientation of depth camera 22 relative to game player 18. It will be appreciated that a processing pipeline may include additional steps and/or alternative steps than those depicted in FIG. 2 without departing from the scope of this disclosure.

During image collection 28, game player 18 and the rest of observed scene 24 may be imaged by a depth camera 22. In particular, the depth camera is used to observe gestures of the game player. During image collection 28, the depth camera may determine, for each pixel, the depth of a surface in the observed scene relative to the depth camera. Virtually any depth finding technology may be used without departing from the scope of this disclosure. Example depth finding technologies are discussed in more detail with reference to FIG. 18.

During depth mapping 30, the depth information determined for each pixel may be used to generate a depth map 32. Such a depth map may take the form of virtually any suitable data structure, including but not limited to a matrix that includes a depth value for each pixel of the observed scene. In FIG. 2, depth map 32 is schematically illustrated as a pixelated grid of the silhouette of game player 18. This illustration is for simplicity of understanding, not technical accuracy. It is to be understood that a depth map generally includes depth information for all pixels, not just pixels that image the game player 18. Depth mapping may be performed by the depth camera or the gaming system, or the depth camera and the gaming system may cooperate to perform the depth mapping.

During skeletal modeling 34, one or more depth images (e.g., depth map 32) of a world space scene including a computer user (e.g., game player 18) are obtained from the depth camera. Virtual skeleton 36 may be derived from depth map 32 to provide a machine readable representation of game player 18. In other words, virtual skeleton 36 is derived from depth map 32 to model game player 18. The virtual skeleton 36 may be derived from the depth map in any suitable manner. In some embodiments, one or more skeletal fitting algorithms may be applied to the depth map. For example, a prior trained collection of models may be used to label each pixel from the depth map as belonging to a particular body part, and virtual skeleton 36 may be fit to the labeled body parts. The present disclosure is compatible with virtually any skeletal modeling techniques.

The virtual skeleton provides a machine readable representation of game player 18 as observed by depth camera 22. The virtual skeleton 36 may include a plurality of joints, each joint corresponding to a portion of the game player. Virtual skeletons in accordance with the present disclosure may include virtually any number of joints, each of which can be associated with virtually any number of parameters (e.g., three dimensional joint position, joint rotation, body posture of corresponding body part (e.g., hand open, hand closed, etc.) etc.). It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.).

Skeletal modeling may be performed by the gaming system. In some embodiments, the gaming system may include a dedicated skeletal modeler that can be used by a variety of different applications. In this way, each application does not have to independently interpret depth maps as machine readable skeletons. Instead, the individual applications can receive the virtual skeletons in an anticipated data format from the dedicated skeletal modeler (e.g., via an application programming interface or API). In some embodiments, the dedicated skeletal modeler may be a remote modeler accessible via a network. In some embodiments, an application may itself perform skeletal modeling.

During game output 38, the physical movements of game player 18 as recognized via the virtual skeleton 36 are used to control aspects of a game, application, or operating system. In the illustrated scenario, game player 18 is playing a fantasy themed game and has performed a spell throwing gesture. The game recognizes the gesture by analyzing the virtual skeleton 36, and displays an image of the hands of a player character 16 throwing a fireball 40. In some embodiments, an application may leverage various graphics hardware and/or graphics software to render an interactive interface (e.g., a spell-casting game) for display on a display device.

Some applications may include two or more different operating modes. For example, a spell-casting game may have one or more spell-casting modes in which a player character within the game is able to cast spells and/or other modes in which the player character does not cast spells. The gestures of the game player in the real world may be used to enter the spell-casting mode, select spells to be cast, aim spells, and cast spells.

FIG. 3 shows an example method 42 of entering a spell casting mode, selecting a spell, and casting a spell within a spell-casting game. Method 42 may be performed by a spell-casting game executing on gaming system 12 for example.

At 44, method 42 includes acknowledging a ready posture of a game player. In some embodiments, the game player may be observed by a depth camera and modeled with a virtual skeleton, as described above. A position of one or more joints of the virtual skeleton may be translated/interpreted as a ready posture or any of the other gestures described herein depending on the relative joint positions and joint movement from frame to frame. As a nonlimiting example, FIG. 4A shows a virtual skeleton 36 in an example ready posture. In the illustrated embodiment, the ready posture is characterized by a left hand joint and a right hand joint positioned near waist level in front of a torso.

Figure 4B:
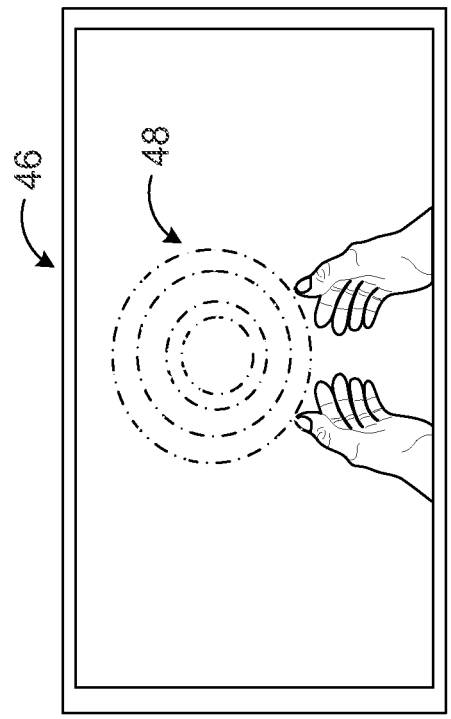
FIG. 4B shows an interactive interface indicating a spell-casting game mode.
Figure 4A:
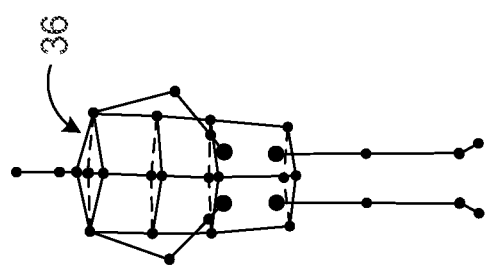
FIG. 4A shows a skeleton in an example ready posture.

FIG. 4B shows a game interface 46 providing the game player visual feedback that a spell-casting mode has been initiated via the ready gesture. In particular, the game system is outputting a spell ready visual 48 that is displayed to the game player to visually indicate activation of the spell-casting game mode.

Returning to FIG. 3, at 50, method 42 includes identifying a first gesture of the virtual skeleton as one of a plurality of different possible spell-selection gestures. Each different spell-selection gesture may be characterized by a different posture and/or movement of the virtual skeleton. A spell-casting game may recognize the various spell-selection gestures based on the position of one or more skeletal joints relative to one or more other skeletal joints from frame to frame.

Figure 5B:
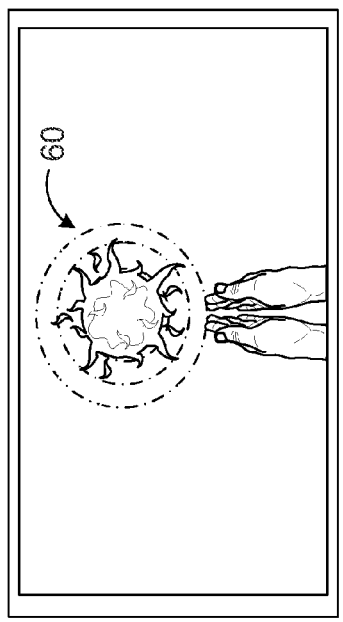
FIG. 5B shows an interactive interface indicating spell selection.
Figure 6B:
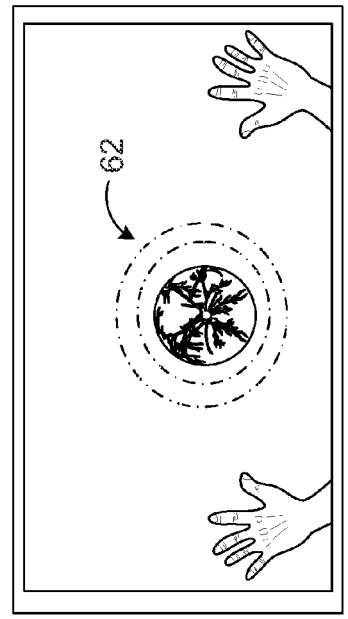
FIG. 6B shows an interactive interface indicating spell selection.
Figure 5A:
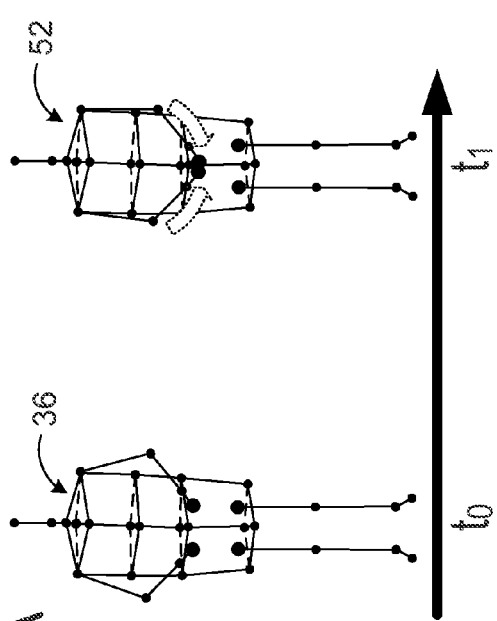
FIG. 5A shows a skeleton performing an example spell-selection gesture.
Figure 6A:
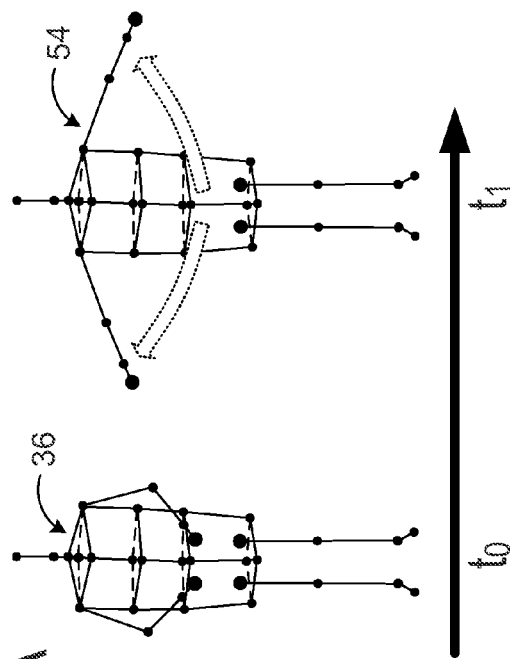
FIG. 6A shows a skeleton performing an example spell-selection gesture.
Figure 7A:
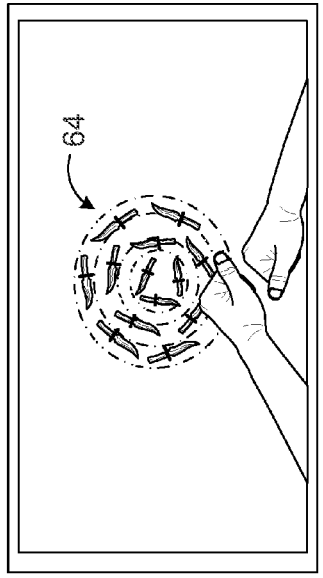
FIG. 7A shows a skeleton performing an example spell-selection gesture.
Figure 8A:
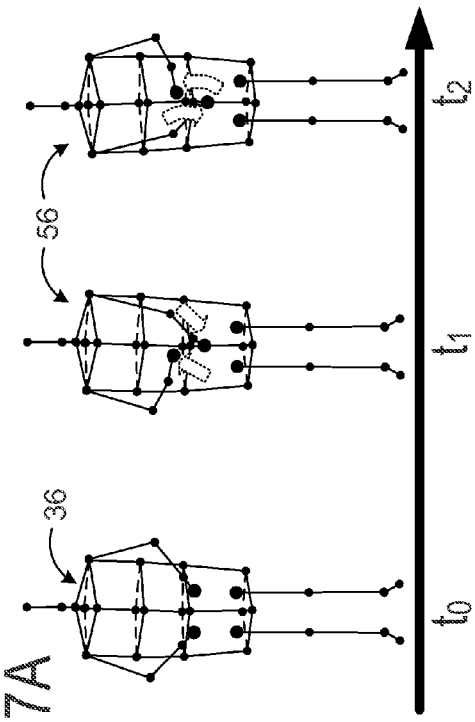
FIG. 8A shows a skeleton performing an example spell-selection gesture.

As a nonlimiting example, FIG. 5A shows a spell-selection gesture 52 characterized by a left hand joint and a right hand joint moving together from the ready posture at waist level in front of a torso. As another nonlimiting example, FIG. 6A shows a spell-selection gesture 54 characterized by a left hand joint and a right hand joint spreading apart from the ready posture with a left elbow joint and a right elbow joint straightened. As another nonlimiting example, FIG. 7A shows a spell-selection gesture 56 characterized by a left hand joint and a right hand joint circling one another at waist level in front of a torso. As another nonlimiting example, FIG. 8A shows a spell-selection gesture 58 characterized by a left hand joint and a right hand joint oppositely moving up and down at waist level in front of a torso.

Each different spell-selection gesture may be associated with a different spell castable by a player character within the spell-casting game. As such, a game player may physically perform a spell-selection gesture to ready the particular spell associated with that spell-selection gesture.

Figure 7B:
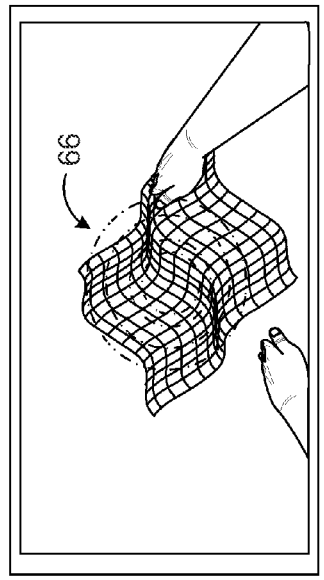
FIG. 7B shows an interactive interface indicating spell selection.
Figure 8B:
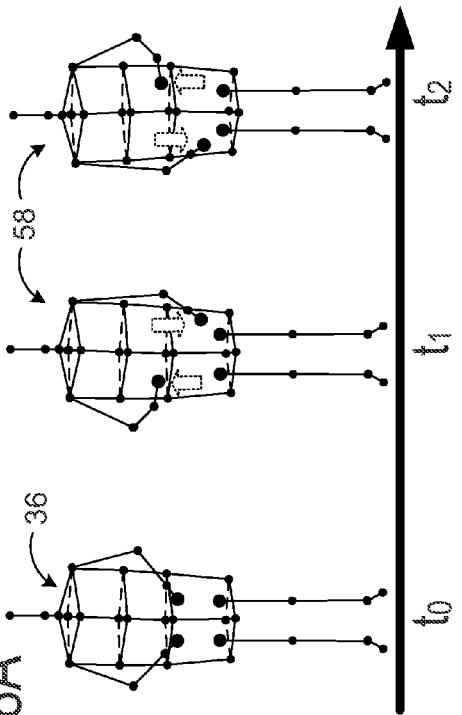
FIG. 8B shows an interactive interface indicating spell selection.

The gaming system may output a spell-selection visual for display to the game player to visually indicate which of the different spells is readied for casting. As nonlimiting examples, FIG. 5B shows a spell-selection visual 60 indicating that a fireball spell is readied for casting; FIG. 6B shows a spell-selection visual 62 indicating that a lightning bolt spell is readied for casting; FIG. 7B shows a spell-selection visual 64 indicating that a knife flurry spell is readied for casting; and FIG. 8B shows a spell-selection visual 66 indicating that an earthquake spell is readied for casting;

Upon identifying the spell-selection gesture, a spell may be readied for casting. In some embodiments, a spell will not be readied for casting unless a ready posture is acknowledged prior to the spell-selection gesture. In such embodiments, the ready posture can be used to set the game in the proper spell-casting mode. In other embodiments, spells may be cast even if the game is not in a dedicated spell-casting mode, and a ready posture is not used to set the game in a dedicated spell-casting mode.

Returning to FIG. 3, at 68, method 42 includes identifying a second gesture of the virtual skeleton as a spell-casting gesture. Various spell-casting gestures, including one-handed and two-handed spell-casting gestures, are within the scope of this disclosure. Nonlimiting examples of spell-casting gestures are described below in more detail with reference to FIGS. 12-17.

At 70 of FIG. 3, method 42 includes casting, within the spell-casting game, the spell associated with the previously identified spell-selection gesture—i.e., the currently readied spell. According to method 42, the same spell-casting gesture causes casting of each of the different spells associated with the plurality of different spell-selection gestures. In other words, the game player physically performs different gestures to select different spells, but each of these different spells is cast by performing the same spell-casting gesture or gestures. Further, each of the different spells that may be selected with different gestures may be aimed, redirected, augmented, or otherwise controlled as described below with reference to the various spell-casting gestures—e.g., the one-handed spell-casting gesture of FIG. 13A and the two-handed spell-casting gesture of FIG. 14A.

Furthermore, in some embodiments, a spell-selection gesture may be performed with a discernable magnitude. For example, the speed at which a user moves his hands, the distance along which a user moves his hands, and/or other variations of the same spell-selection gesture may be used to ready a spell with a corresponding magnitude. Using the example of FIG. 8A, if a user moves his hands up and down a few inches relatively slowly, an earthquake spell may be readied with a relatively small magnitude. On the other hand, if the user moves his hands up and down more than a foot relatively quickly, the same earthquake spell may be readied with a relatively large magnitude. When cast, the selected spell may be resolved with a magnitude proportional to a magnitude of the spell-selection gesture used to ready the spell. For example, an earthquake spell readied with a small magnitude gesture may cause less damage to opponents than an earthquake spell readied with a large magnitude gesture. In some embodiments, the magnitude of the spell-selection gesture may be used to select different spells and/or different variations of the same spell.

Figure 9:
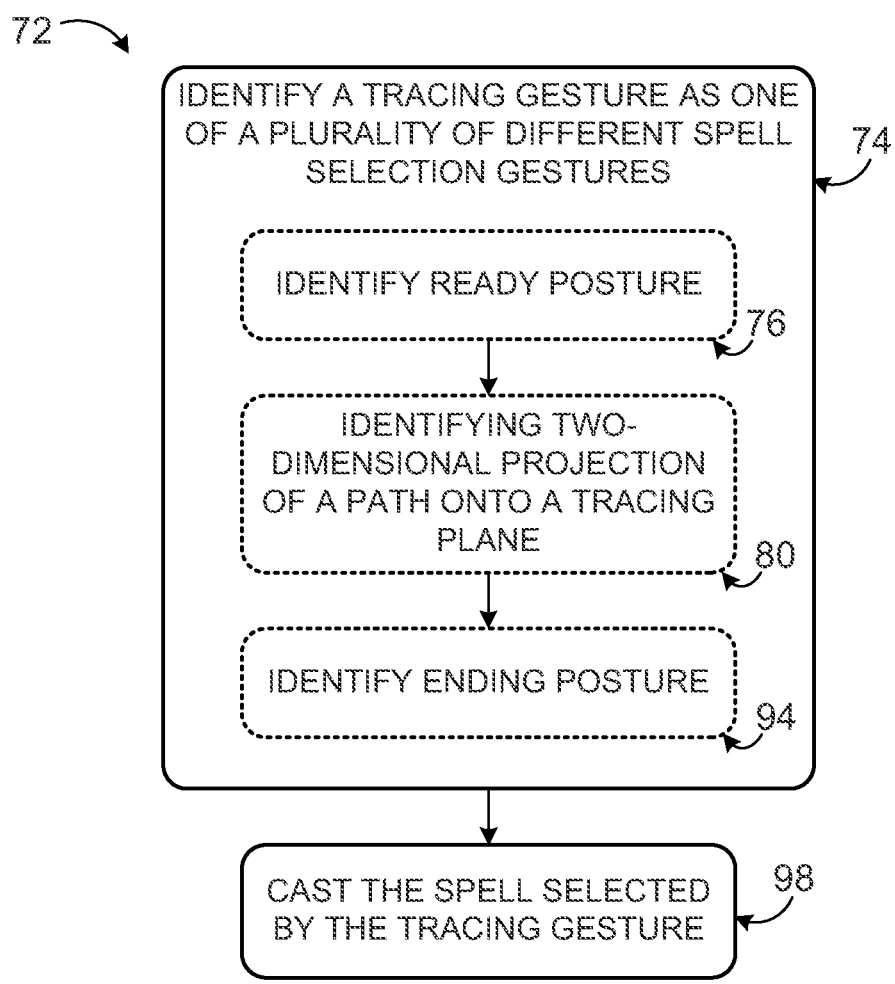
FIG. 9 shows an example one-stage spell casting method in accordance with an embodiment of the present disclosure.

As described above, method 42 is a two-step casting technique in which a spell is selected using one gesture and triggered using another gesture. FIG. 9 shows a method 72 that uses a one-step casting technique in which the same gesture that is used to select a spell is also used to cast the spell. Method 72 may be performed by a spell-casting game executing on gaming system 12 of FIG. 1, for example.

At 74, method 72 includes identifying a tracing gesture of the game player as one of a plurality of different spell-selection gestures. In some embodiments, the game player may be observed by a depth camera and modeled with a virtual skeleton, as described above. A position and/or movement of one or more joints of the virtual skeleton may be translated/interpreted as the tracing gesture. As with the spell-selection gesture described above, the tracing gesture is one of a plurality of different recognizable tracing gestures. Each of the different recognizable tracing gestures is associated with a different spell castable within the spell-casting game. As such, by performing a particular tracing gesture, a game player may cause the player character he is controlling in the game to cast the particular spell associated with that particular tracing gesture.

Figure 10:
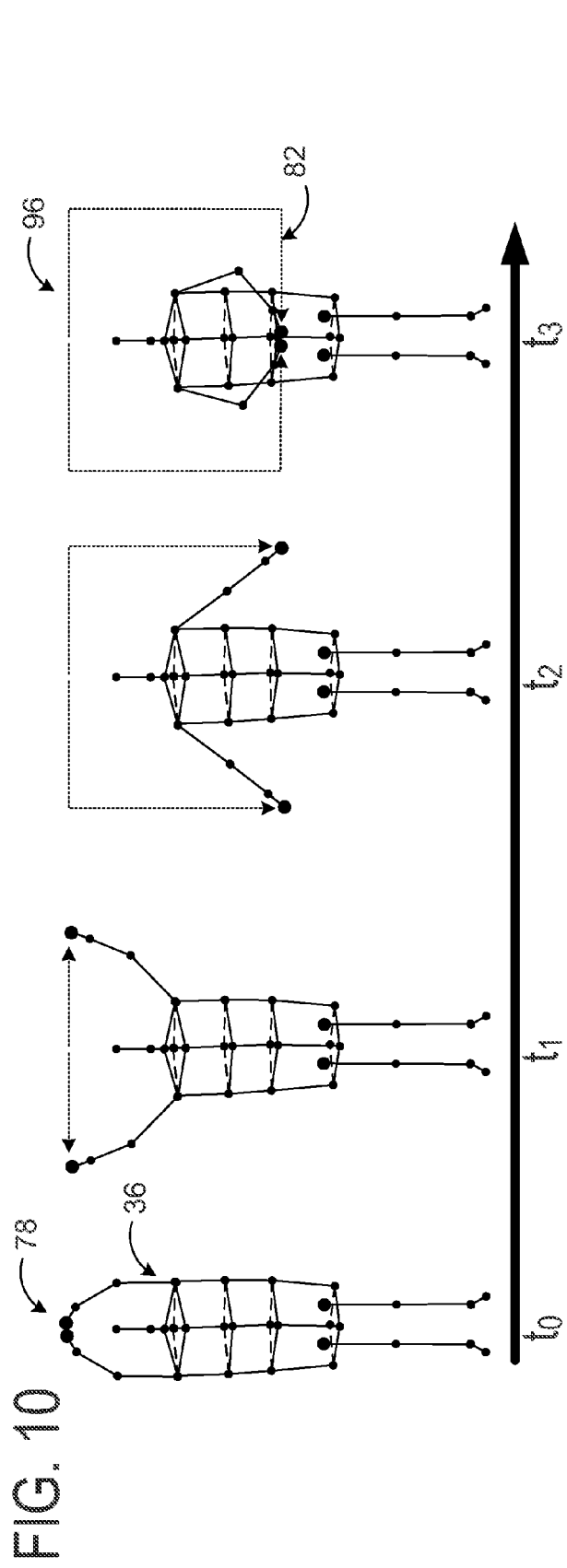
FIG. 10 shows a skeleton performing a tracing gesture.

At 76, method 72 may optionally include identifying a position of the left hand joint and/or a position of the right hand joint in a predetermined ready posture at a beginning of the tracing gesture. Various ready postures may be used without departing from the scope of this disclosure. As a nonlimiting example, FIG. 10 shows a ready posture 78 characterized by the left hand and the right hand held together above the head of the game player. In other words, the left hand joint and the right hand joint are within a threshold distance (e.g., less than or equal to six inches) of one another in a position that is relatively higher than a head joint of the virtual skeleton. This example is not limiting, and other ready postures may be used without departing from the scope of this disclosure.

The ready posture can be used to set the game in the proper spell-casting mode. Further, different ready postures may be used to set the game in different spell-casting modes. For example, the ready posture shown in FIG. 4 may be used to set the game in the two-stage spell-casting mode described with reference to FIG. 3, while the ready posture shown in FIG. 10 may be used to set the game in a one-stage spell-casting mode described with reference to FIG. 9.

At 80 of FIG. 9, method 72 may optionally include identifying a two-dimensional traced shape that is a two-dimensional projection of a path of a left hand joint of the virtual skeleton and/or a path of a right hand joint of the virtual skeleton onto a tracing plane. For example, FIG. 10 shows a left hand joint and a right hand joint tracing a shape in three-dimensional space. The non-planar paths of the hand joints are projected onto a tracing plane that is perpendicular to an optical axis of the depth camera imaging the game player. The shape of the two-dimensional projection 82 onto the tracing plane indicates the spell that is to be cast.

Figure 11:
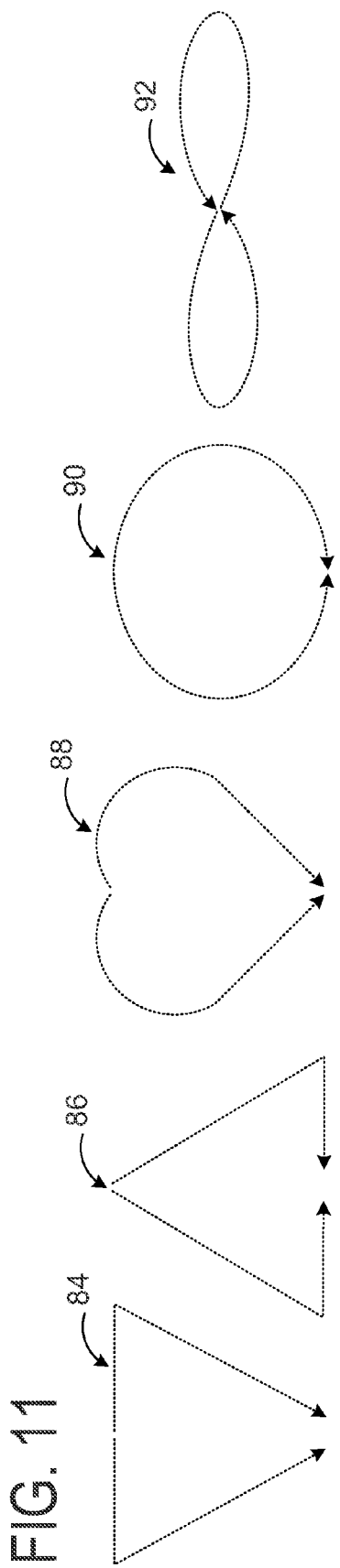
FIG. 11 shows a variety of traceable shapes.

In the scenario shown in FIG. 10, the two-dimensional projection 82 is in the shape of a square. FIG. 11 shows nonlimiting examples of other two-dimensional projections that may be formed by different tracing gestures. In particular, FIG. 11 shows an inverted triangle 84; a triangle 86; a heart 88; a circle 90; and an infinity symbol 92. Each shape may correspond to one of a plurality of different spells. As nonlimiting examples, inverted triangle 84 may correspond to a shield spell; triangle 86 may correspond to a teleport spell; heart 88 may correspond to a heal spell; circle 90 may correspond to a slow time spell; and infinity symbol 92 may correspond to light spell.

At 94, method 72 may optionally include identifying a position of the left hand joint and/or a position of the right hand joint in a predetermined ending position at an end of the tracing gesture. Such an ending position may be characterized by only the relative position of the left hand compared to the right hand, or the ending position also may be characterized by the relative position of the hand joints compared to other skeletal joints. In some embodiments, the end of the gesture is recognized when the hands return together—i.e., within a threshold distance of one another. In some embodiments, the end of the gesture is recognized when the hands move within a predetermined space in front of the game player torso. At time t3, FIG. 10 shows a left hand joint and a right hand joint returning together in an ending position 96 in front of the torso, thus signaling the end of the tracing gesture.

Turning back to FIG. 9, at 98, method 72 includes casting a spell associated with the identified tracing gesture within the spell-casting game. Unlike the two-stage casting described above with reference to FIG. 3, this one-stage casting is performed responsive to identifying a conclusion of the tracing gesture without requiring a subsequent spell-casting gesture to trigger the release of the selected spell. In other words, according to method 72, the same tracing gesture may be used to both select and cast the spell.

Providing one-stage casting and two-stage casting in the same game allows for a rich, highly interactive casting experience. One-stage casting may be used for spells that are not aimed at a particular target (e.g., in-game enemy)—for example, a spell to teleport a player character from one location to another, a spell to heal the player character, a spell to slow time, and/or a spell to put up a defensive shield. On the other hand, two-stage casting may be used for spells that are aimed at a particular target—for example, a fireball spell aimed at an enemy, an open door spell aimed at a locked door, and/or a strengthen spell aimed at a friend of the player character.

Figure 12:
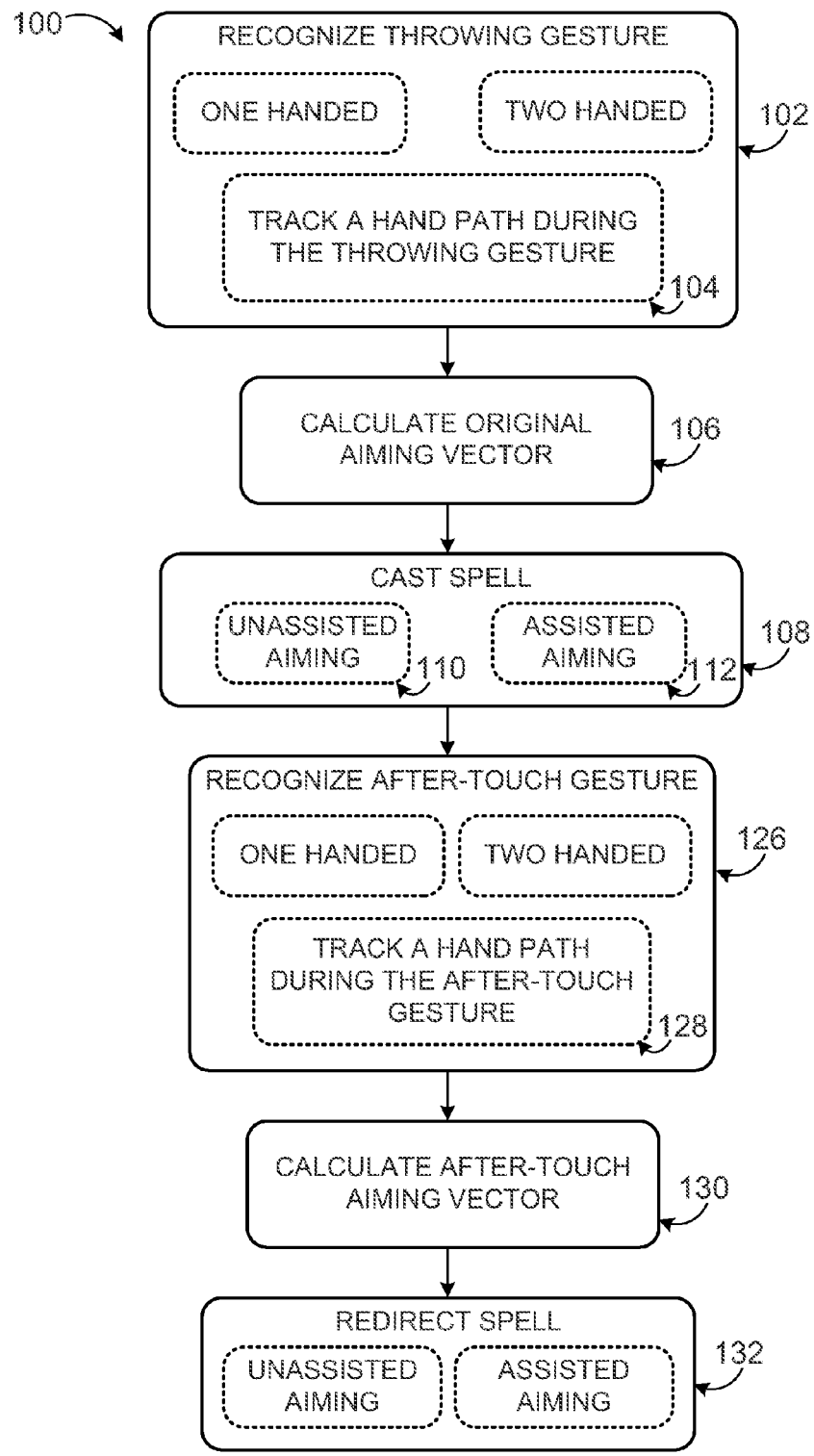
FIG. 12 shows an example spell aiming method in accordance with an embodiment of the present disclosure.

FIG. 12 shows an example method 100 of casting a spell within a spell-casting game. Method 100 may correspond to the second stage of the above described two-stage casting method. In other words, method 100 may be used after another gesture has been recognized as selecting one of a plurality of different possible spells for casting. Alternatively, method 100 may be used independently of spell-selection gestures—i.e., to cast a default spell or a spell automatically selected without user intervention. Method 100 may be performed by a spell-casting game executing on gaming system 12 of FIG. 1, for example.

At 102, method 100 includes recognizing a throwing gesture of the virtual skeleton. In some embodiments, a single type of throwing gesture may be recognized, while some embodiments may allow for two or more different types of throwing gestures.

As a nonlimiting example, a one-handed, overhanded throwing gesture (FIGS. 13A and 13B) may be one type of throwing gesture, while a two-handed, pushing throwing gesture (FIGS. 14A and 14B) may be another type of throwing gesture.

FIG. 13A shows skeleton 36 moving from a ready posture at time $t_0$ to a hands-closed posture at time $t_1$ to select a fireball spell, as indicated at time $t_1$ of FIG. 13B. At time $t_2$, skeleton 36 cocks a right hand joint back as if readying to throw a dart. At time $t_3$, skeleton 36 moves the right hand joint forward as if to throw the dart. As indicated at time $t_3$ of FIG. 13B, this throwing motion may be interpreted as a triggering gesture, and the fireball spell may be cast in response to the gesture.

Figure 14A:
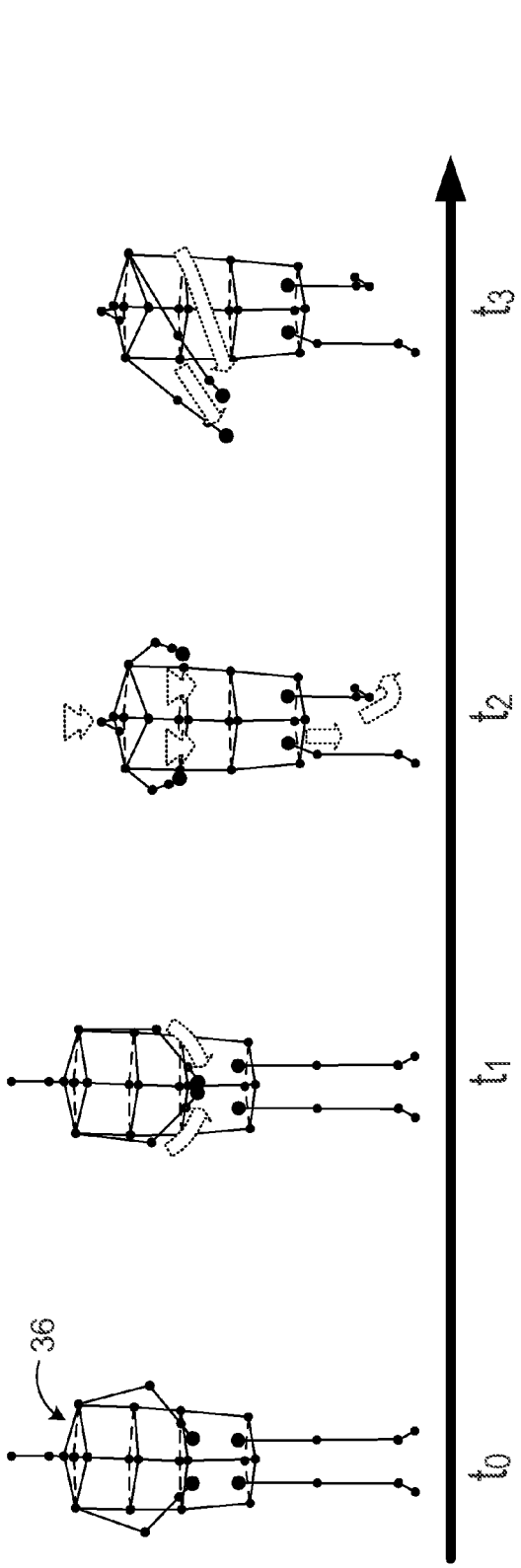
FIG. 14A shows a skeleton performing an example two-handed spell throwing gesture with after-touch in accordance with an embodiment of the present disclosure.
Figure 14B:
FIG. 14B shows an example interactive interface as a two-handed spell throwing gesture with after-touch is performed.

FIG. 14A shows skeleton 36 moving from a ready posture at time $t_0$ to a hands-closed posture at time $t_1$ to select a fireball spell, as indicated at time $t_1$ of FIG. 14B. At time $t_2$, skeleton 36 thrusts both a right hand joint and a left hand joint back out as if throwing a basketball from the chest. As indicated at time $t_2$ of FIG. 14B, this throwing motion may be interpreted as a triggering gesture, and the fireball spell may be cast in response to the gesture. At time $t_3$, skeleton 36 moves hands to the right as if to push an object aside. As indicated at time $t_3$ of FIG. 14B, this redirecting motion may be interpreted as an after-touch gesture, and the fireball spell may be redirected in response to the gesture.

When two or more throwing gestures are used, the different gestures may produce the same in-game action, or the different gestures may produce different in-game actions. For example, a first spell may be resolved if the throwing gesture is a one-handed throwing gesture while a second spell, different than the first spell, may be resolved if the throwing gesture is a two-handed throwing gesture.

At 104, method 100 includes tracking a path of a left hand joint of the virtual skeleton and/or a path of a right hand joint of the virtual skeleton during the throwing gesture. In general, a path of one hand is tracked for one-handed throwing gestures, and paths of both hands are tracked for two-handed throwing gestures. In some embodiments, an average position of the left and right hands may be tracked for two-handed gestures. As used herein, "path" is used to refer to two or more points observed at different times. In some embodiments, the path includes points from all frames of the throwing gesture, and in some embodiments only points from selected frames are considered.

At 106, method 100 includes calculating an original aiming vector from the path of the left hand joint and/or the path of the right hand joint during the throwing gesture. In some embodiments, the vector may be fit to the various points of the gesture path. As one nonlimiting example, the vector may be orientated so as to minimize the sum of squares of distances between a line orientated with the vector and two or more points constituting the path. The origin of the vector may be positioned in various locations without departing from the scope of this disclosure. In some embodiments, the origin of the vector may be positioned at a game-space location corresponding to the location of the player character. In general, the magnitude of the vector may be superfluous, but when needed, the magnitude may be set in accordance with a speed of the throwing gesture.

Figure 15B:
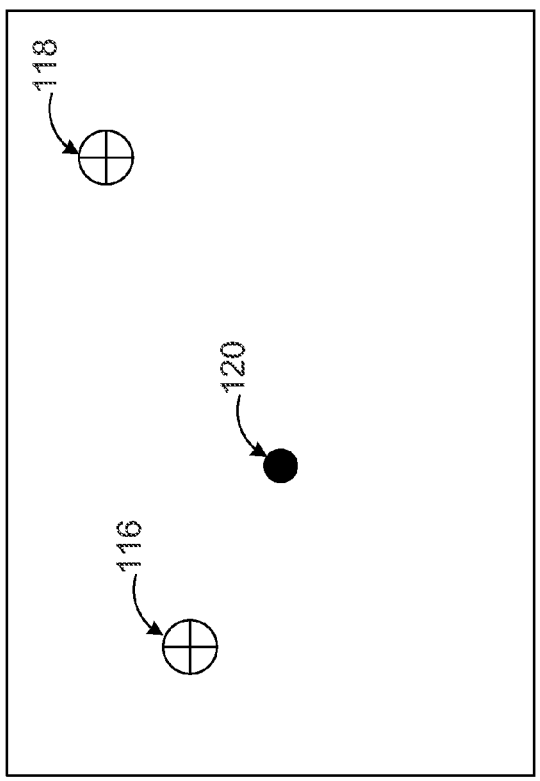
FIG. 15B schematically shows unassisted aiming analysis of the fireball spell of FIG. 15A.
Figure 15A:
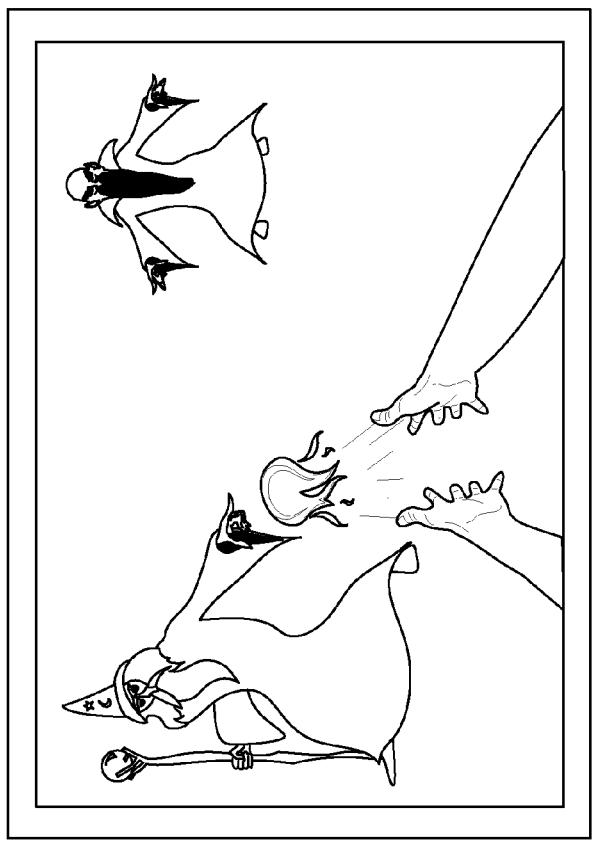
FIG. 15A is an example interactive interface showing a player character casting a fireball spell at an in-game opponent.

At 108, method 100 includes casting the spell. At 110, casting the spell may optionally include directing a spell along the original aiming vector. In other words, the spell may be aimed without any aiming assistance and/or player intention analysis. For example, FIG. 15A shows a game interface 114 in which two evil wizards are attacking a player character controlled by the game player. FIG. 15B schematically shows a bull's eye 116 corresponding to a position of the first evil wizard and a bull's eye 118 corresponding to a position of the second evil wizard. FIG. 15B also shows an aiming point 120 in line with the aiming vector. In this scenario, the aiming point does not hit a bull's eye, and there is no aiming assistance, so the fireball spell cast by the player character misses both evil wizards.

Figure 16A:
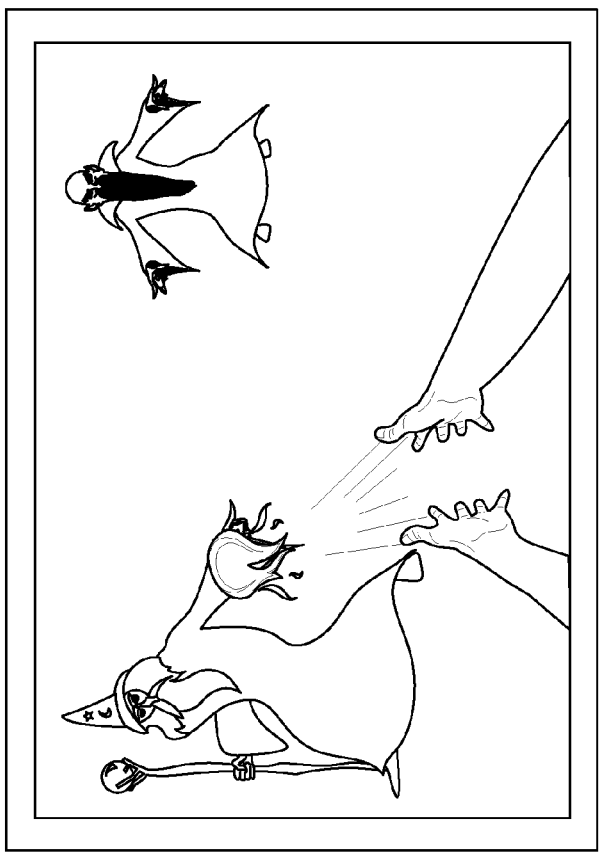
FIG. 16A is an example interactive interface showing a player character casting a fireball spell at an in-game opponent.
Figure 16B:
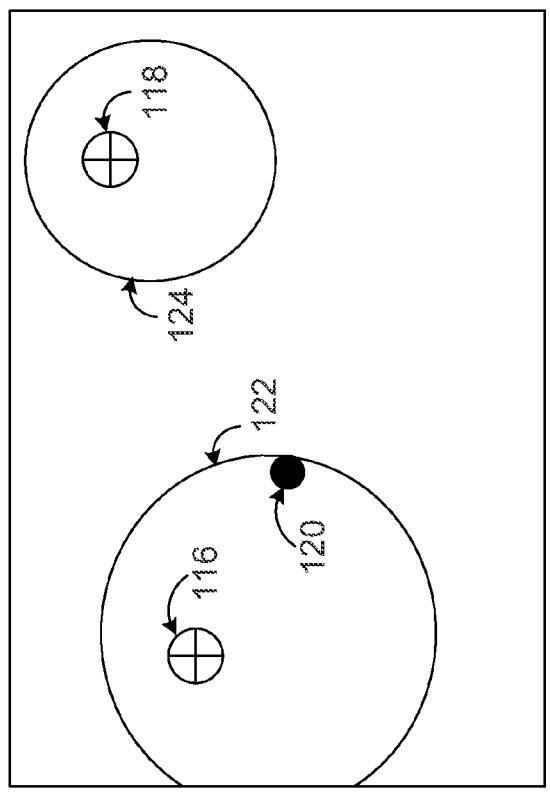
FIG. 16B schematically shows assisted aiming analysis of the fireball spell of FIG. 16A.

Turning back to FIG. 12, at 112, casting the spell may include directing a spell at a primary target within a threshold distance of the original aiming vector. In other words, if the aiming vector points to within a threshold distance of a game target, the game may assist in aiming the spell to hit the target. For example, FIG. 16A shows the same game interface 114 with two evil wizards attacking a player character, and FIG. 16B schematically shows bull's eye 116 and a bull's eye 118. However, FIG. 16B also indicates an expanded target 122 within a threshold distance of the bull's eye 116 and an expanded target 124 within a threshold distance of bull's eye 118. In this scenario, the aiming point 120 does not hit the bull's eye, but it is within the expanded target 122. As such, the aiming assistance casts the fireball spell at the evil wizard. In other words, the game player's inaccuracy is auto-corrected by the game. In essence, the game assesses the game player's intended target and assists the game player in hitting the target.

In some embodiments, a spell may resolve with a relatively larger magnitude if the original aiming vector is within a relatively shorter threshold distance of a primary target and a relatively smaller magnitude if the original aiming vector is within a relatively longer threshold distance of the primary target. In other words, if the aiming vector hits the bull's eye, the spell will have a greater effect than if the aiming vector misses the bull's eye but hits the expanded target. If the aiming vector misses the expanded target, the spell may be resolved with a zero magnitude.

The size and shape of the bull's eye and expanded target may be set to alter the difficulty and/or skill intensity of the game. Furthermore, while a single expanded target is discussed above, it is to be understood that multiple expanded targets may be used, each resulting in a different magnitude. In some embodiments, the magnitude of the spell may be calculated as a linear or nonlinear function of the distance of the aiming point to a bull's eye or other target. While discussed above in the context of expanding the aiming point, the same effect may be achieved by increasing the size of the aiming point.

Turning back to FIG. 12, at 126, method 100 includes recognizing an after-touch gesture of the virtual skeleton. Like the initial throwing gesture, the after touch gesture may be one-handed or two-handed. The after-touch gesture may be used to redirect a spell from an original trajectory. For example, the after-touch gesture may be used to hit a second opponent with a fireball spell after a first opponent has been hit. As another example, the after-touch gesture may be used to hit an opponent with a spell after an initial miss. As yet another example, the after-touch gesture may be used to move a spell along an indirect path to a target, so as to avoid obstacles hindering a straight shot.

Returning to FIG. 14A, at time t3 the skeleton is moving a left hand joint and a right hand joint to the side with arms outstretched from a two-handed throwing position. Such an after-touch gesture may be used to redirect a spell from the left to the right, as indicated in the interactive interface illustrated in FIG. 14B.

At 128 of FIG. 12, method 100 may include tracking a path of a left hand joint of the virtual skeleton and/or a path of a right hand joint of the virtual skeleton during the after-touch gesture. At 130, method 100 may include calculating an after-touch aiming vector within the spell-casting game from the path of the left hand joint and/or the path of the right hand joint during the after-touch gesture. As discussed above with reference to the throwing gestures, a path may be two or more points derived from one or more skeletal joints. Further, the aiming vector may be calculated in any suitable manner based on the path. As one example, the three-dimensional path may be projected onto an after-touch plane, and the aiming vector may be fit to the projection. At 132, the spell may be redirected in accordance with the after-touch aiming vector, either with or without aiming assistance.

Figure 17B:
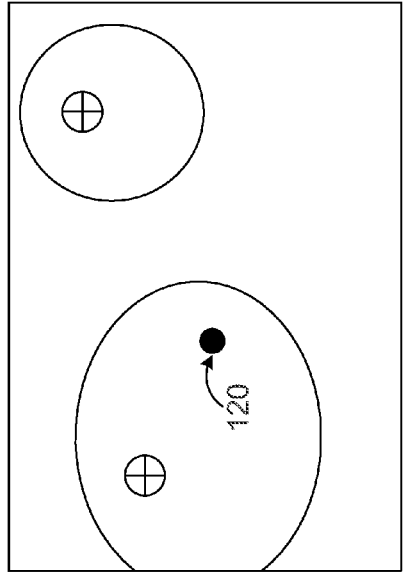
FIG. 17B schematically shows assisted aiming analysis of the fireball spell of FIG. 17A.
Figure 17D:
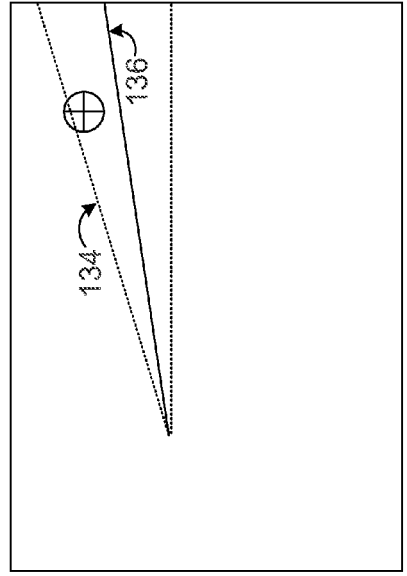
FIG. 17D schematically shows assisted aiming analysis of the after-touch redirection of FIG. 17C.
Figure 17A:
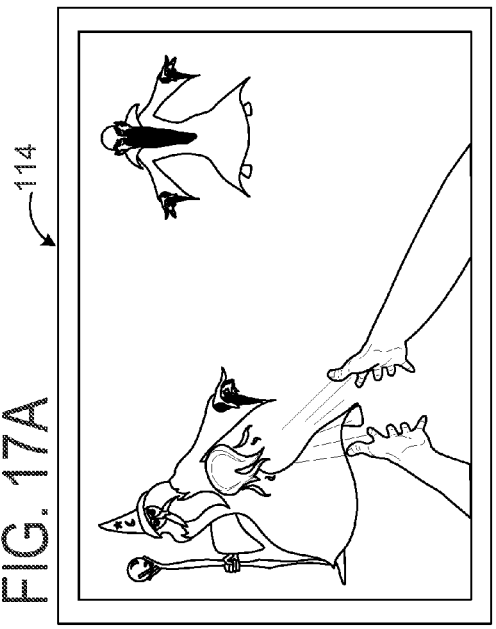
FIG. 17A is an example interactive interface showing a player character casting a fireball spell at an in-game opponent.
Figure 17C:
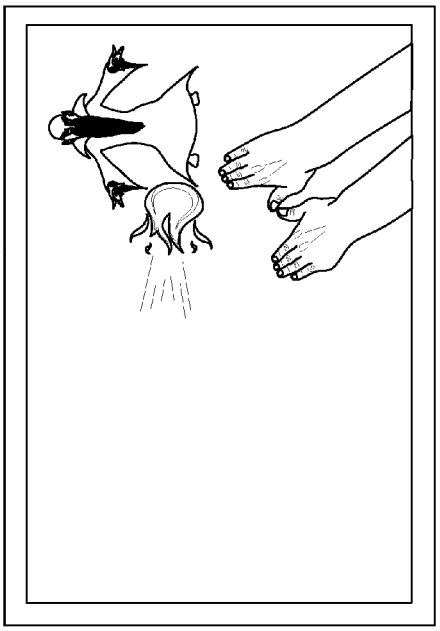
FIG. 17C is an example interactive interface showing a player character after-touch redirecting the fireball spell of FIG. 17A at another in-game opponent.

FIGS. 17A-17D show an example after-touch scenario and implementation. In particular, FIG. 17A shows a game interface 114 in which two evil wizards are attacking a player character controlled by the game player, and FIG. 17B schematically shows an aiming point 120 targeting and hitting one of the wizards (with assisted aiming). In this scenario, the game player performs a spell throwing gesture to cast a readied spell at the evil wizard on the left, and the spell is resolved by hitting and eliminating the evil wizard. FIG. 17D shows an after-touch aiming vector calculated from a path of one or more skeletal joints—e.g., the path of right hand joint and left hand joint from time t2 to time t3 in FIG. 14A. As shown in FIG. 17C, the fireball spell is redirected toward the evil wizard on the right in response to the after-touch gesture of the game player.

In some scenarios, the spell may be redirected along the after-touch aiming vector from a starting position derived from the original aiming vector without aiming assistance. In some scenarios, the spell may be redirected at a secondary target within a threshold distance of the after-touch aiming vector. For example, FIG. 17D shows a wedge 134 around aiming vector 136. In some embodiments, the after-touch gesture will produce a hit if the target is within the wedge. In other embodiments, the aiming vector must intersect a bull's eye to produce a hit.

The magnitude with which the spell is resolved may be dependent on the accuracy of the after-touch gesture. For example, the spell may be resolved with a relatively larger magnitude if the after-touch aiming vector is within a relatively shorter threshold distance of a target, or with a relatively smaller magnitude if the after-touch aiming vector is only within a relatively longer threshold distance of the target. In some embodiments, the magnitude of the after-touch effect may be calculated as a linear or nonlinear function of the distance of the aiming vector to a bull's eye or other target.

It should be understood that the assisted aiming examples provided above with respect to throwing gestures and after-touch gestures are nonlimiting. In other embodiments, other mechanisms may be implemented to provide a game player with a desired amount of aiming assistance.

In some embodiments, one or more aspects of the gesture-based interactive interface controls described above may be replaced or augmented with audio controls. For example, returning to FIG. 2, instead of or in addition to visually observing and modeling a game player, a gaming system may acoustically observe and model a game player. In particular, a microphone may be used to listen to the game player, and the sounds made by the game player may serve as audible commands, which may be identified by the gaming system. Audible commands may take a variety of different forms, including but not limited to spoken words, grunts, claps, stomps, and/or virtually any other sounds that a game player is capable of making.

As a nonlimiting example, an audible command may be identified as one of a plurality of different spell selection commands, each spell selection command associated with a different spell castable by a player character within the spell-casting game.

FIG. 2 schematically shows game player 18 shouting the command "fireball" while a spell-casting game is in a spell-casting mode. Such a command may be used to select the corresponding fireball spell, which may be cast in response to the game player's spell throwing gesture, for example. Such audible spell selection may be used instead of gestural spell selection in some embodiments. As schematically illustrated in FIG. 2, the observed sounds of a game player, as input via a microphone, may be analyzed to identify spoken commands. As a nonlimiting example, a speech recognition algorithm may be used to model the spoken sounds as machine readable words.

In some embodiments, audible commands may be used to modify an aspect of a spell. As a nonlimiting example, the magnitude of a spell may be increased in proportion to the volume with which an audible command is delivered. As another example, the effectiveness of a spell may be modified based on the content, timing, and/or volume with which an audible command is delivered.

While the above described examples are provided in the context of a spell-casting game, it is to be understood that the principles discussed herein may be applied to other types of games, applications, and/or operating systems. In particular, a variety of different interactive interfaces may be controlled as described above. The spell selection and spell tracing gestures described above may be used to select other actions executable within a particular interactive interface. When outside the realm of spell-casting games, such gestures may be referred to as action selection gestures instead of spell-selection gestures and/or tracing gestures. Furthermore, the various actions may be triggered using action triggering gestures, which are analogous to the spell triggering and spell throwing gestures described above.

In some embodiments, the above described methods and processes may be tied to a computing system including one or more computers. In particular, the methods and processes described herein may be implemented as a computer application, computer service, computer API, computer library, and/or other computer program product.

Figure 18:
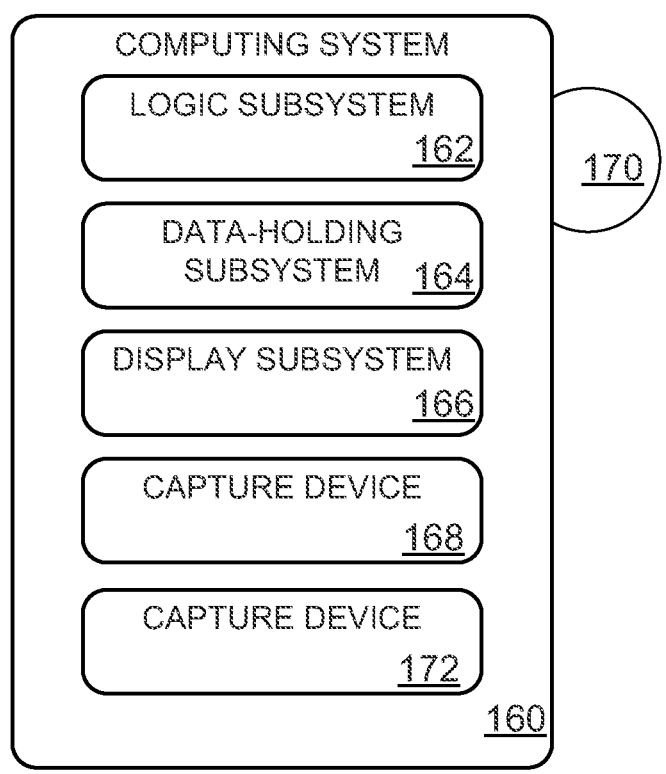
FIG. 18 schematically shows a computing system in accordance with an embodiment of the present disclosure.

FIG. 18 schematically shows a non-limiting computing system 160 that may perform one or more of the above described methods and processes. Computing system 160 is shown in simplified form. It is to be understood that virtually any computer architecture may be used without departing from the scope of this disclosure. In different embodiments, computing system 160 may take the form of a console gaming device, a hand-held gaming device, a mobile gaming device, a mainframe computer, a server computer, a desktop computer, a laptop computer, a tablet computer, a home entertainment computer, a network computing device, a mobile computing device, a mobile communication device, etc. Gaming system 12 of FIG. 1 is a nonlimiting embodiment of computing system 160.

Computing system 160 may include a logic subsystem 162, a data-holding subsystem 164, a display subsystem 166, a capture device 168, and/or a communication subsystem 172. The computing system may optionally include components not shown in FIG. 18, and/or some components shown in FIG. 18 may be peripheral components that are not integrated into the computing system.

Logic subsystem 162 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 164 may include one or more physical, non-transitory, devices configured to hold data and/or instructions executable by the logic subsystem to implement the herein described methods and processes. When such methods and processes are implemented, the state of data-holding subsystem 164 may be transformed (e.g., to hold different data and/or instructions).

Data-holding subsystem 164 may include removable media and/or built-in devices. Data-holding subsystem 164 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 164 may include devices with one or more of the following characteristics: volatile, nonvolatile, dynamic, static, read/write, read-only, random access, sequential access, location addressable, file addressable, and content addressable. In some embodiments, logic subsystem 162 and data-holding subsystem 164 may be integrated into one or more common devices, such as an application specific integrated circuit or a system on a chip.

FIG. 18 also shows an aspect of the data-holding subsystem in the form of removable computer-readable storage media 170, which may be used to store and/or transfer data and/or instructions executable to implement the herein described methods and processes. Removable computer-readable storage media 170 may take the form of CDs, DVDs, HD-DVDs, Blu-Ray Discs, EEPROMs, and/or floppy disks, among others.

It is to be appreciated that data-holding subsystem 164 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

Display subsystem 166 may be used to present a visual representation of data held by data-holding subsystem 164. As the herein described methods and processes change the data held by the data-holding subsystem, and thus transform the state of the data-holding subsystem, the state of display subsystem 166 may likewise be transformed to visually represent changes in the underlying data. Display subsystem 166 may include one or more display devices utilizing virtually any type of technology. Such display devices may be combined with logic subsystem 162 and/or data-holding subsystem 164 in a shared enclosure, or such display devices may be peripheral display devices, as shown in FIG. 1. In some embodiments, the computing system may include a display output (e.g., an HDMI port) to output an interactive interface to a display device.

Computing system 160 further includes a capture device 168 configured to obtain depth images of one or more targets. Capture device 168 may be configured to capture video with depth information via any suitable technique (e.g., time-of-flight, structured light, stereo image, etc.). As such, capture device 168 may include a depth camera (such as depth camera 22 of FIG. 1), a video camera, stereo cameras, and/or other suitable capture devices. In some embodiments, the computing system may include a peripheral input (e.g., a USB 2.0 port) to receive depth images from a capture device.

In one embodiment, capture device 168 may include left and right cameras of a stereoscopic vision system. Time-resolved images from both cameras may be registered to each other and combined to yield depth-resolved video. In other embodiments, capture device 168 may be configured to project onto an observed scene a structured infrared illumination comprising numerous, discrete features (e.g., lines or dots). Capture device 168 may be configured to image the structured illumination reflected from the scene. Based on the spacings between adjacent features in the various regions of the imaged scene, a depth map of the scene may be constructed.

In other embodiments, Capture device 168 may be configured to project a pulsed infrared illumination onto the scene. One or more cameras may be configured to detect the pulsed illumination reflected from the scene. For example, two cameras may include an electronic shutter synchronized to the pulsed illumination, but the integration times for the cameras may differ, such that a pixel-resolved time-of-flight of the pulsed illumination, from the source to the scene and then to the cameras, is discernable from the relative amounts of light received in corresponding pixels of the two cameras.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

It is to be understood that at least some depth mapping and/or gesture recognition operations may be executed by a logic machine of one or more capture devices. A capture device may include one or more onboard processing units configured to perform one or more target analysis and/or tracking functions. A capture device may include firmware to facilitate updating such onboard processing logic.

In some embodiments, computing system 160 may include a communication subsystem 172. When included, communication subsystem 172 may be configured to communicatively couple computing system 160 with one or more other computing devices. Communication subsystem 172 may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, etc. In some embodiments, the communication subsystem may allow computing system 160 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A data-holding subsystem holding instructions executable by a logic subsystem to:
 render a spell-casting game for display on a display device;
 receive a virtual skeleton including a plurality of joints, the virtual skeleton providing a machine readable representation of a game player observed with a depth camera;
 identify a first gesture of the virtual skeleton as one of a plurality of different gestures, each of the plurality of different gestures characterized by different relative positions of the plurality of joints over time, and each such gesture associated with a different spell castable within the spell-casting game by a player character controlled by gestures of the game player;

identify a second gesture of the virtual skeleton that is performed after completion of the first gesture and is characterized by different relative positions of the plurality of joints over time than any of the plurality of different gestures; and responsive to identifying the second gesture, cast the spell associated with the first gesture within the spell-casting game with a magnitude proportional to one or both of a speed at which hands of the game player move when performing the first gesture and a distance hands of the game player move when performing the first gesture, wherein a same second gesture causes casting of each of the different spells associated with the plurality of different gestures when that spell has been readied by the associated gesture.

2. The data-holding subsystem of claim 1, further holding instructions executable by a logic subsystem to:
output a spell magnitude visual displayable to the game player to visually indicate a magnitude with which the spell is readied.

3. The data-holding subsystem of claim 1, further holding instructions executable by a logic subsystem to:
translate a position of one or more joints of the virtual skeleton as a ready posture; and
acknowledge the ready posture before readying the spell associated with the first gesture for casting.

4. The data-holding subsystem of claim 3, further holding instructions executable by a logic subsystem to:
output a spell ready visual displayable to the game player to visually indicate activation of a spell-casting game mode.

5. The data-holding subsystem of claim 1, further holding instructions executable by a logic subsystem to:
output a spell selection visual displayable to the game player to visually indicate which of the different spells castable within the spell-casting game is readied for casting.

6. The data-holding subsystem of claim 1, further holding instructions executable by a logic subsystem to:
identify an audible command as one of a plurality of different spell selection commands, each spell selection command associated with a different spell castable by the player character within the spell-casting game.

7. The data-holding subsystem of claim 1, further holding instructions executable by a logic subsystem to:
identify an audible command while in a spell-casting game mode; and
augment an aspect of a spell in accordance with the audible command.

8. A method of executing a spell-casting game on a computing system, the method comprising:
receiving at the computing system information from a depth camera useable by the computing system to recognize gestures of a game player, each recognized gesture characterized by a changing pose of the game player over time;
identifying, with the computing system, a first gesture of the game player as one of a plurality of different gestures, each such gesture associated with a different spell castable within the spell-casting game executed on the computing system by a player character controlled by gestures of the game player;
identifying, with the computing system, a second gesture of the game player that is performed after completion of the first gesture and is different than any of the plurality of different gestures; and responsive to identifying the second gesture, casting the spell associated with the first gesture within the spell-casting game executed on the computing system with a magnitude proportional to one or both of a speed at which hands of the game player move when performing the first gesture and a distance hands of the game player move when performing the first gesture, wherein a same second gesture causes casting of each of the different spells associated with the plurality of different gestures when that spell has been readied by the associated gesture.

9. The method of claim 8, further comprising:
outputting a spell magnitude visual displayable to the game player to visually indicate a magnitude with which the spell is readied.

10. The method of claim 8, further comprising:
translating a position of one or more joints of a virtual skeleton as a ready posture; and
acknowledging the ready posture before readying the spell associated with the first gesture for casting.

11. The method of claim 8, further comprising:
outputting a spell ready visual displayable to the game player to visually indicate activation of a spell casting game mode.

12. An entertainment system, comprising:
a peripheral input to receive depth images from a depth camera;
a display output to output an interactive interface to a display device;
a logic subsystem operatively connectable to the depth camera via the peripheral input and to the display device via the display output;
a data holding subsystem holding instructions executable by the logic subsystem to:
receive from the depth camera one or more depth images of a world space scene including a computer user;
model the computer user with a virtual skeleton including a plurality of joints;
translate a position of one or more joints of the virtual skeleton as a selected one of a plurality of different gestures, each of the plurality of different gestures characterized by different relative positions of the plurality of joints over time, and each such gesture associated with a different action performable within the interactive interface;
translate a position of one or more joints of the virtual skeleton as a different gesture; and
responsive to identifying the different gesture, perform within the interactive interface the action associated with the selected one of the plurality of different gestures with a magnitude proportional to one or both of a speed at which hands of the game player move when performing the selected one of the plurality of different gestures and a distance hands of the game player move when performing the selected one of the plurality of different gestures.

13. The entertainment system of claim 12, wherein a same gesture triggers each of the different actions associated with the plurality of different gestures when that action has been readied by the associated gesture.

14. The entertainment system of claim 12, further holding instructions executable by a logic subsystem to:
translate a position of one or more joints of the virtual skeleton as a ready posture; and
acknowledge the ready posture before readying an action associated with a gesture.

* * * * *